United States Patent
Wang et al.

(10) Patent No.: US 11,891,536 B2
(45) Date of Patent: Feb. 6, 2024

(54) COATING, INJECTION NEEDLE AND METHOD FOR MANUFACTURING THE SAME

(71) Applicant: Fulian Yuzhan Precision Technology Co., Ltd, Shenzhen (CN)

(72) Inventors: Wei Wang, Shenzhen (CN); Bo-Ling Xu, Shenzhen (CN); Xiao-Qing Fu, Shenzhen (CN); Li-Li Zhang, Shenzhen (CN)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 0 days.

(21) Appl. No.: 17/533,407

(22) Filed: Nov. 23, 2021

(65) Prior Publication Data
US 2022/0169891 A1 Jun. 2, 2022

(30) Foreign Application Priority Data
Dec. 2, 2020 (CN) .......................... 202011402400.7

(51) Int. Cl.
*C09D 183/08* (2006.01)
*C08G 77/18* (2006.01)
(Continued)

(52) U.S. Cl.
CPC .......... *C09D 183/08* (2013.01); *B05D 3/141* (2013.01); *B05D 7/146* (2013.01); *B05D 7/225* (2013.01); *B05D 7/24* (2013.01); *B32B 1/00* (2013.01); *B32B 1/08* (2013.01); *B32B 27/283* (2013.01); *C08G 77/18* (2013.01); *C08G 77/24* (2013.01); *C09D 5/00* (2013.01); *B05C 17/00503* (2013.01); *B05D 1/36* (2013.01); *B05D 2202/15* (2013.01); *B05D 2518/12* (2013.01); *C23C 4/16* (2013.01)

(58) Field of Classification Search
CPC ........ C09D 183/08; A61L 27/04; B05D 5/083
See application file for complete search history.

(56) References Cited

FOREIGN PATENT DOCUMENTS

| CN | 103205201 A | 7/2013 |
|---|---|---|
| CN | 108299913 A | 7/2018 |

(Continued)

OTHER PUBLICATIONS

R1, ALIAS for AKTA pure, 2014, Spark Holland, pp. 1-6 (Year: 2014).*

*Primary Examiner* — Dah-Wei D. Yuan
*Assistant Examiner* — Andrew J Bowman
(74) *Attorney, Agent, or Firm* — ScienBiziP, P.C.

(57) ABSTRACT

A non-stick, durable, and long-serving coating in an inner surface of a tube that transports adhesive, a material of the coating includes polysiloxane. The polysiloxane includes a first monomer unit and a second monomer unit. The first monomer unit is at least one group selected from the group consisting of $-O-Si-(R_1)(R_2)(R_3)$, $Si-(R_1)(R_2)(-O-)_2$, and $Si-(R_1)(-O-)_3$, the $R_1$, $R_2$ and $R_3$ being independently selected from the group consisting of substituted alkyl and unsubstituted alkyl. The second monomer unit includes $Si(-O-)_4$. An injection needle and a method for manufacturing the coating on an injection needle is also provided.

19 Claims, 2 Drawing Sheets

(51) Int. Cl.

| | | |
|---|---|---|
| *C08G 77/24* | (2006.01) | |
| *C09D 5/00* | (2006.01) | |
| *B32B 1/00* | (2006.01) | |
| *B32B 27/28* | (2006.01) | |
| *B32B 1/08* | (2006.01) | |
| *B05D 7/22* | (2006.01) | |
| *B05D 3/14* | (2006.01) | |
| *B05D 7/14* | (2006.01) | |
| *B05D 7/24* | (2006.01) | |
| *B05D 1/36* | (2006.01) | |
| *C23C 4/16* | (2016.01) | |
| *B05C 17/005* | (2006.01) | |

(56) References Cited

FOREIGN PATENT DOCUMENTS

| CN | 109762464 A | | 5/2019 | |
|---|---|---|---|---|
| KR | 20120111664 | * | 1/2012 | ............. B05D 5/083 |
| WO | WO2005/067992 | * | 1/2005 | ............. A61L 27/04 |

* cited by examiner

COATING, INJECTION NEEDLE AND METHOD FOR MANUFACTURING THE SAME

CROSS-REFERENCE TO RELATED APPLICATIONS

This application claims all benefits accruing under 35 U.S.C. § 119 from Chinese Patent Application No. 202011402400.7, filed on Dec. 2, 2020, in the State Intellectual Property Office of China, the entire contents of which are incorporated herein by reference.

FIELD

The subject matter herein generally relates to coating, and more particularly, relates to a coating, an injection needle and a method for manufacturing the coating applied on the injection needle.

BACKGROUND

Products may be assembled from multiple parts. Different parts can be assembled together such as by welding, injection molding, or bonding. When different parts are assembled together by bonding, adhesive is first applied on one part, and then the other parts are pressed on the adhesive, so that the parts are joined together by the adhesive. The adhesive is usually applied on the part through an injection needle. However, the injection needle may be blocked by the adhesive, resulting in a short service life and frequent replacement of the injection needle, decreasing productivity and increasing cost.

SUMMARY

In view of the above situation, it is necessary to provide a coating, an injection needle and a method for manufacturing the coating applied on the injection needle to solve at least one of the above-mentioned problems.

According to some embodiments, a coating applied on a tube for transporting adhesive, a material of the coating includes polysiloxane. The polysiloxane includes a first monomer unit and a second monomer unit. The first monomer unit includes at least one selected from a group consisting of $-O-Si-(R_1)(R_2)(R_3)$, $Si-(R_1)(R_2)(-O-)_2$, and $Si-(R_1)(-O-)_3$. the second monomer unit includes $Si(-O-)_4$. The $R_1$, $R_2$ and $R_3$ are independently selected from the group consisting of substituted alkyl and unsubstituted alkyl.

According to some embodiments, the $R_1$, $R_2$ and $R_3$ are independently selected from alkyl with not more than four carbon atoms.

According to some embodiments, at least one of the $R_1$, $R_2$ and $R_3$ is selected from fluoroalkyl.

According to some embodiments, the tube is made of stainless steel; and the coating is bonded to the tube through a chemical bond of —O—.

According to some embodiments, a thickness of the coating is in the range of 0.1 μm to 2 μm.

According to some embodiments, a surface roughness of the coating is in the range of 2 nm to 100 nm.

According to some embodiments, a bonding force between the tube and the coating is at least 4 B under a cross-cut test.

An injection needle applied to transporting adhesive includes a tube and a coating. The coating is formed on the inner surface of the tube. The material of the coating comprises polysiloxane. The polysiloxane comprises a first monomer unit and a second monomer unit. The first monomer unit comprises at least one group selected from the group consisting of $-O-Si-(R_1)(R_2)(R_3)$, $Si-(R_1)(R_2)(-O-)_2$, and $Si-(R_1)(-O-)_3$. The second monomer unit comprises $Si(-O-)_4$. The $R_1$, $R_2$ and $R_3$ groups are independently selected from the group consisting of substituted alkyl and unsubstituted alkyl.

According to some embodiments, the $R_1$, $R_2$ and $R_3$ are independently selected from alkyl with not more than four carbon atoms.

According to some embodiments, at least one group of the $R_1$, $R_2$ and $R_3$ is selected from fluoroalkyl.

According to some embodiments, the tube is made of stainless steel; and the coating is bonded to the tube through a chemical bond of —O—.

According to some embodiments, a thickness of the coating is in the range of 0.1 μm to 2 μm.

According to some embodiments, a surface roughness of the coating is in the range of 2 nm to 100 nm.

According to some embodiments, a bonding force between the tube and the coating is at least 4 B under a cross-cut test.

A method for manufacturing a coating applied on an injection needle for transporting adhesive. The injection needle comprising a tube. The method comprises: applying a hydroxylation treatment on the tube to form hydroxyl groups on an inner surface of the tube; immersing the tube in a slurry; wherein the slurry comprises a first monomer and a second monomer, the first monomer is selected from a silane containing at least one alkoxy and at least one alkyl, and the second monomer is selected from a silicate ester; applying a leveling treatment on the slurry adhered to the inner surface of the tube; and curing the slurry to form the coating on the inner surface of the tube. The alkyl in the silane and the alkyl in the silicate ester are independently selected from the group consisting of substituted alkyl and unsubstituted alkyl; the silane comprises at least one selected from the group consisting of monosilane and bisilane; the silicate ester comprises at least one selected from the group consisting of monosilate ester and bisilate ester.

According to some embodiments, the alkyl group in the silane and the alkyl group in the silicate are independently selected from alkyl with not more than four carbon atoms.

According to some embodiments, at least one of the alkyl in the silane and the alkyl in the silicate is selected from fluoroalkyl.

According to some embodiments, a material of the tube comprises stainless steel, and the step of applying a hydroxylation treatment on the tube comprises: applying a plasma treatment in an air atmosphere to form hydroxyl groups on the tube; wherein a power of a plasma treatment machine in the plasma treatment is in the range of 100 W to 1000 W, and a time period of the plasma treatment is in the range of 0.5 min to 10 min.

According to some embodiments, an angle for leveling treatment applied on the slurry is in the range of 45 degrees to 90 degrees. A time period of leveling treatment applied on the slurry is in the range of 0.1 h to 1 h. A temperature for curing the slurry is in the range of 70 degrees Celsius to 80 degrees Celsius. A time period for curing the slurry is in the range of 2 h to 6 h.

In the disclosure, the outermost surface of the coating is composed of alkyl. The alkyl has excellent chemical stability, and do not react with the adhesive, thus effectively increase the service life of the injection needle. The method for manufacturing the coating applied on the injection needle in the disclosure, the raw materials are silane and silicate, and these raw materials are easily available, which is beneficial to reduce production costs. The method for manufacturing the coating has low requirements for equipment. The coating can be mass-produced. The method for manufacturing the coating also reduces the preparation cost, the reaction temperature is low, and the plastic will not be affected.

BRIEF DESCRIPTION OF THE DRAWINGS

Implementations of the present disclosure will now be described, by way of example only, with reference to the attached figures.

DETAILED DESCRIPTION

Figure 1:
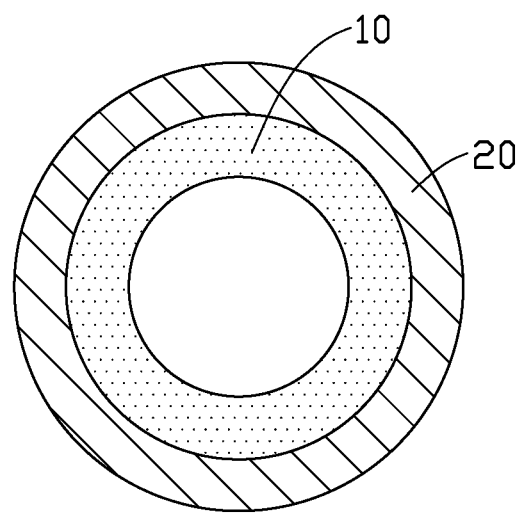
FIG. 1 illustrates simplified cross-sectional side view of an injection needle, in accordance with some embodiments of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

The term "comprising," when utilized, means "including, but not necessarily limited to"; it specifically indicates open-ended inclusion or membership in the so-described combination, group, series, and the like. If no conflict, the following embodiments and features in the embodiments can be combined with each other.

In some embodiments illustrated in FIG. 1, an injecting needle 100 is provided. The injecting needle 100 includes a coating 10 and a tube 20. The coating 10 is applied on an inner surface of the tube 20 for transporting an adhesive. The tube 20 is made of stainless steel. The coating 10 prevents the tube 20 from being blocked by the adhesive.

A diameter of the tube 20 is not limited. In some embodiments, the diameter of the tube 20 is small, such as needle-size; in some embodiments, the diameter of the tube 20 is large.

The coating 10 is made of polysiloxane. The polysiloxane includes a first monomer unit and a second monomer unit. The first monomer unit is at least one selected from the group consisting of —O—Si—$(R_1)(R_2)(R_3)$, Si—$(R_1)(R_2)$(—O—)$_2$, and Si—$(R_1)$(—O—)$_3$. The second monomer unit contains Si(—O—)$_4$.

The polysiloxane is formed by a polymerization of silane compound containing at least one consisting of the $R_1$, $R_2$, and $R_3$.

The $R_1$, $R_2$ and $R_3$ are independently selected from the group consisting of substituted alkyl and unsubstituted alkyl. A chemical stability of the alkyl is high. During transport of the adhesive, the coating 10 does not react with the tube 20 or the adhesive, so as to prevent the adhesive from blocking the tube 20 and improve a service life of the injection needle 100.

The $R_1$, $R_2$ and $R_3$ are independently selected from alkyl with not more than four carbon atoms. The alkyl is at least one selected from the group consisting of methyl, ethyl, n-propyl, isopropyl, n-butyl, isobutyl, sec-butyl, and tert-butyl.

At least one of the $R_1$, $R_2$ and $R_3$ can be fluoroalkyl. That is, at least one hydrogen atom in the $R_1$, $R_2$ and $R_3$ is replaced by a fluorine atom. The fluorine atom increases a wear resistance of the coating 10, thereby improving the service life of the injection needle 100.

The coating 10 is applied on the tube 20 after hydroxylation treatment, and the coating 10 is bonded to the tube 20 through a chemical bond of —O—, thus, a bonding force between the tube 20 and the coating 10 is strong. The bonding force between the tube 20 and the coating 10 is at least 4B under a cross-cut test.

A thickness of the coating 10 is about in the range of 0.1 μm to 2 μm. If the thickness of the coating 10 is too thick, the coating 10 will be hard to solidify, and the stress of the coating will be high. Small crack may appear on the coating due the high stress. The adhesive may stick on the surface with small crack, which will cause the tube 20 blocked by the sticking adhesive, which reduces the service life of the injection needle 100. If the thickness of the coating 10 is too thin, the coating 10 cannot fully cover the inner surface of the tube 20, due to the adhesive having higher binding force with the rough surface than with the smooth surface, the adhesive will stick on the surface without coating 10 to block the tube 20, which also reduces the service life of the injection needle 100.

A surface roughness of the coating 10 is about in the range of 2 nm to 100 nm.

According to some embodiments, a method for manufacturing the coating 10 inside a tube 20 is also provided. The coating applied on an injection needle 100 for transporting adhesive. The injection needle 100 includes the tube 20. The tube 20 is made of stainless steel.

Figure 2:
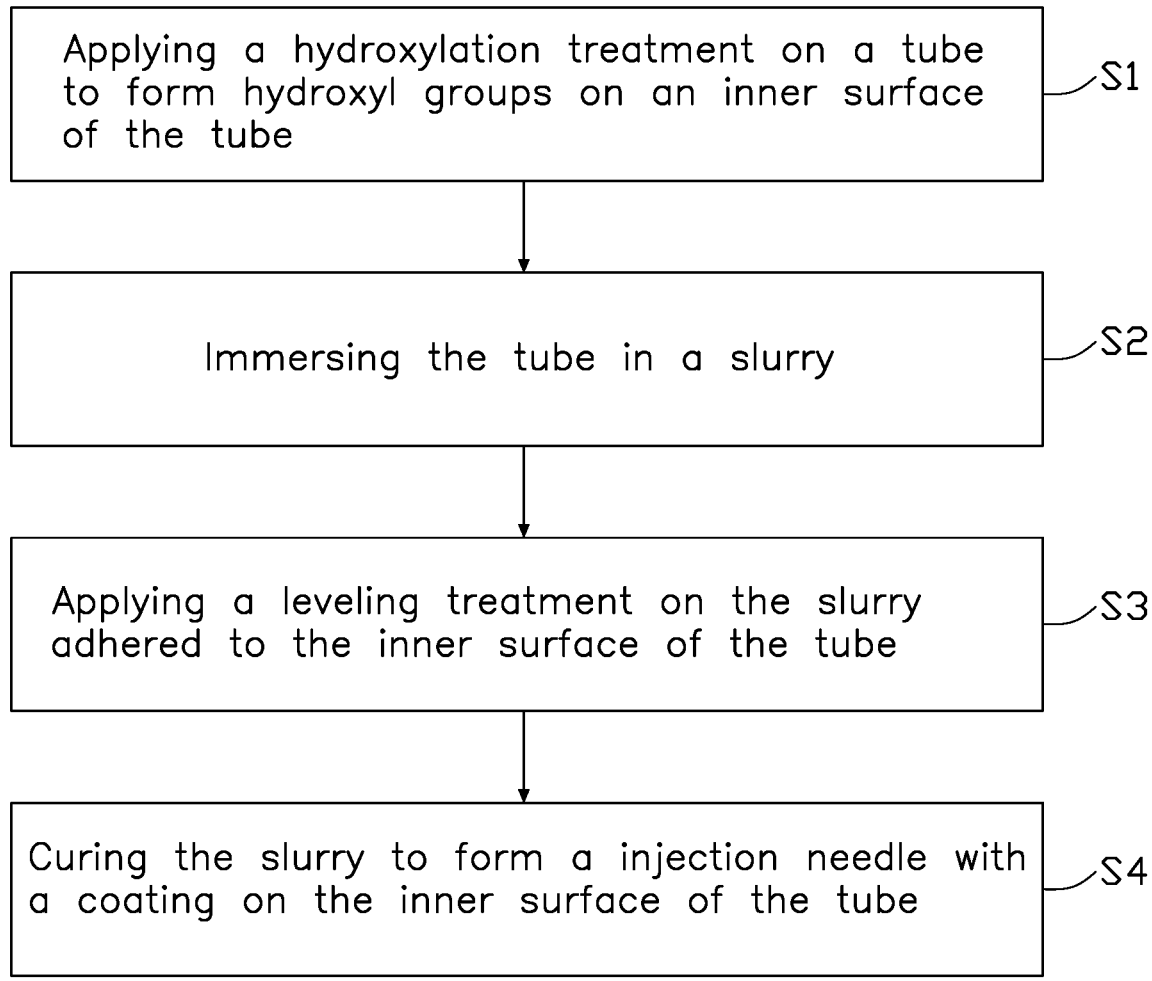
FIG. 2 illustrates a flowchart of a method for manufacturing an injection needle, in accordance with some embodiments of the present disclosure.

In some embodiments illustrated in FIG. 2, the method for manufacturing the injection needle 100 includes following steps.

Step S1: applying a hydroxylation treatment on the tube 20 to form hydroxyl groups on an inner surface of the tube 20.

The step S1 can be carried out by applying a plasma treatment in an air atmosphere to form hydroxyl groups on the tube 20. According to some embodiments, the plasma treatment is applied in oxygen atmosphere to quickly form the hydroxyl groups on the tube 20. The hydroxyl groups increase an electrical polarity of the tube 20, which is conducive to adhesion of the coating 10 and increases the bonding force between the tube 20 and the coating 10.

According to some embodiments, the tube 20 is combined with another tube which made of plastic. For example, a needle holder containing stainless steel can be placed at one end of a syringe made of plastic. A power of a plasma treatment machine in the plasma treatment is about in the range of 100 W to 1000 W, and a time period of the plasma treatment is about in the range of 0.5 min to 10 min. The power and the time period of the plasma treatment cannot be too high or too long, either one may cause the plastic deformed.

Step S2: immersing the tube 20 in a slurry. The slurry includes a first monomer and a second monomer. The first monomer is selected from silane containing at least one alkoxy and at least one alkyl, and the second monomer is selected from silicate ester.

The alkyl in the silane and the alkyl in the silicate ester are independently selected from the group consisting of substituted alkyl and unsubstituted alkyl. The silane includes at least one selected from the group consisting of monosilane and bisilane. The silicate ester includes at least one selected from the group consisting of monosilate ester and bisilate ester.

A formula of the silane may include, but is not limited to at least one of $R_4O—Si—(R_1)(R_2)(R_3)$, $R_4O—Si—(R_1)(R_2)(—OR_3)$, $R_4O—Si—(R_1)(—OR_2)(—OR_3)$, $(R_1)(R_2)(R_3)—Si—O—Si—(R_4)(R_5)(R_6)$, and $(R_1)(R_2)(R_3)—Si—R_4—Si—(OR_5)(R_6)(R_7)$.

A formula of the silicate ester can be selected from at least one of $(R_8O—)(R_9O—)Si(—OR_{10})(—OR_{11})$, and $(R_8O)(R_9O)(R_{10}O)—Si—O—Si—(OR_{11})(OR_{12})(OR_{13})$.

The first monomer is cross-linked with the second monomer. Specifically, the alkoxy of the first monomer reacts to form a group of

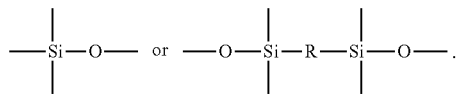

The alkoxy of the second monomer reacts to form a group of

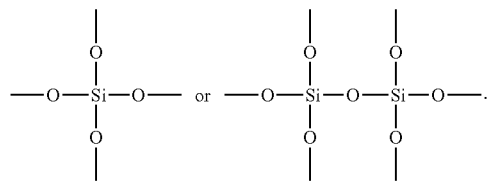

The group of

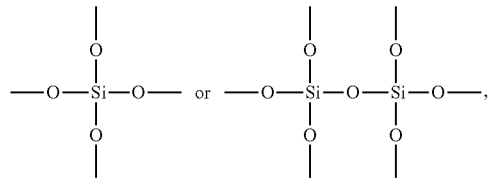

and the group of

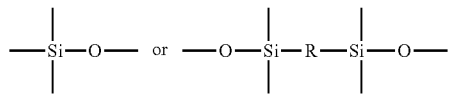

are crosslinked to form a networked structure. The networked structure contains polysiloxane of at least one monomer unit of $—O—Si—(R_1)(R_2)(R_3)$, $—O—Si—(R_1)(R_2)(—O—)$, $—O—Si—(R_1)(—O—)_2$, and $—O—Si(—O—)_3$. The first alkyl connected to silicon in the first monomer is disposed on the outermost layer of the formed polysiloxane. The first alkyl is in contact with the adhesive in the tube 20. The adhesive is mostly a molecule containing a polar group, the first alkyl is alkyl, which is a non-polar molecular. The intermolecular force between the first alkyl and the binder is relatively weak. After the coating 10 is formed, the first alkyl provides toughness to the coating 10, and the first alkyl also provides non-stick properties between the finished coating 10 and the adhesive it carries. After the second monomer is hydrolyzed, a glass-like structure is formed, which provides the coating 10 with a smoothness similar to that of inorganic substances, thereby preventing the coating 10 and the adhesive from being strongly bonded and causing the tube 20 to be blocked. In a percentage content of the coating 10, the first monomer should not be too much, otherwise it will cause the coating 10 to be too elastic, which is not conducive to the transporting of adhesive. A percentage content of the second monomer should not be too much, otherwise it will cause the coating 10 to be too crisp or brittle, and then the coating 10 might crack due to internal stresses during the drying process.

It should be noted that the $R_1$, $R_2$, $R_3$, $R_4$, $R_5$, $R_6$, $R_7$ in silane and the $R_8$, $R_9$, $R_{10}$, $R_{11}$, $R_{12}$, $R_{13}$ in the silicate esters all represent alkyl. In a same embodiment, the $R_1$, $R_2$, $R_3$, $R_4$, $R_5$, $R_6$, $R_7$ and the $R_8$, $R_9$, $R_{10}$, $R_{11}$, $R_{12}$, $R_{13}$ may be the same or different. The $R_1$, $R_2$, $R_3$, $R_4$, $R_5$, $R_6$, $R_7$, $R_8$, $R_9$, $R_{10}$, $R_{11}$, $R_{12}$, and $R_{13}$ merely distinguish between the first alkyl and the second alkyl in the silanes and the alkyl in the silicate esters.

According to some embodiments, the alkyl in the silane (including the first alkyl and the second alkyl) and the alkyl in the silicate are independently selected from alkyl with not more than four carbon atoms. Thus, the alkyl has small steric hindrance, which is beneficial to the reaction between the first monomer and the second monomer.

According to some embodiments, at least one of the alkyl in the silane (including the first alkyl and the second alkyl) and the alkyl in the silicate is selected from fluoroalkyl. After the first monomer reacts with the second monomer, the first alkyl is formed in the coating 10, and the fluoroalkyl increases a wear resistance and hydrophobicity of the coating 10, thereby increasing the service life of the injection needle 100. During the reaction process, the fluoroalkyl connected to oxygen increases the polarity of the first monomer and the second monomer, and is beneficial to the removal of the second alkyl and the alkyl in the second monomer, thereby facilitating the formation of a networked structure.

During a process of immersing the tube 20, ultrasonic treatment and vacuuming steps can also be added to promote uniform distribution of the slurry on the tube 20.

Further, the slurry may include at least one of film-forming agent, viscosity regulator, dispersant, leveling agent, catalyst, and activator.

A mass ratio of the film-forming agent in the slurry is about in the range of 1% to 15%. According to some embodiments, the mass ratio of the film-forming agent in the slurry is one of 2.5%, 5.6%, 8.0%, 11.5%, and 13.9%.

The film-forming agent is at least one selected from the group consisting of dimethylsilanol, polymethylsilanetriol, tetraethyl orthosilicate, methyltriethoxysilane, dimethyldiethylsilane, ethyltrimethoxysilane, ethane-1,2-diylbis(methylsilane), 3-(aminopropyl)triethoxysilane (KH550) and 3-methacryloxypropyltrimethoxysilane (KH570). The addition of the film-forming agent allows the slurry to quickly form film to form a coating 10.

According to some embodiments, the film-forming agent is at least two selected from the group consisting of Tetraethyl orthosilicate, methyltriethoxysilane, dimethyldiethylsilane, ethyltrimethoxysilane and ethane-1,2-diylbis(methylsilane). The selection of the film-forming agent, that is, the selection range of the first monomer and/or the second monomer.

A mass ratio of the viscosity regulator in the slurry is about in the range of 10% to 20%. According to some embodiments, the mass ratio of the viscosity regulator in the slurry is one of 12.3%, 14.2%, 16.0%, 17.8%, and 19.1%.

The viscosity regulator is at least one selected from the group consisting of ethyl acetate, isopropyl acetate, ethylene glycol methyl ether acetate, di(propylene glycol) methyl ether acetate, propylene glycol methyl ether acetate, dipropylene glycol methyl ether acetate, propylene glycol ethyl ether acetate, and dipropylene glycol ethyl ether acetate. The viscosity regulator adjusts the viscosity of the slurry.

According to some embodiments, the viscosity regulator is at least two selected from the group consisting of ethyl acetate, isopropyl acetate, di(propylene glycol) methyl ether acetate and dipropylene glycol methyl ether acetate.

A mass ratio of the dispersant in the slurry is about in the range of 1% to 9%. According to some embodiments, the mass ratio of the dispersant in the slurry is one of 2.5%, 3.6%, 5.6%, 7.0%, and 7.5%.

The dispersant is at least one selected from the group consisting of methanol, ethanol, isopropanol, n-butanol, and isobutanol. The dispersant reduces a force between the components of the slurry and facilitates the dispersion and spreading of the slurry.

According to some embodiments, the dispersant is at least two selected from the group consisting of methanol, ethanol and isopropanol.

A mass ratio of the leveling agent in the slurry is about in the range of 55% to 90%. According to some embodiments, the mass ratio of the leveling agent in the slurry is one of 60%, 66%, 70%, 73%, and 85%.

The leveling agent is at least one selected from the group consisting of 2-methoxyethanol, diethylene glycol monomethyl ether, 1-methoxy-2-propanol, dipropylene glycol monomethyl ether, 2-ethoxyethanol, diethylene glycol monoethyl ether, 1-ethoxy-2-propanol, and dipropylene glycol ethyl ether. The leveling agent reduces an interfacial tension of the slurry and facilitates infiltration between the slurry and the tube 20.

According to some embodiments, the leveling agent is at least two selected from the group consisting of diethylene glycol monomethyl ether, 1-methoxy-2-propanol, and 2-ethoxyethanol.

A mass ratio of the catalyst in the slurry is about in the range of 0.02% to 2%. According to some embodiments, the mass ratio of the catalyst in the slurry is one of 0.10%, 0.52%, 0.85%, 1.28%, and 1.67%.

The catalyst is at least one selected from the group consisting of formic acid, acetic acid, hydrochloric acid, and hydrofluoric acid. The catalyst accelerates the reaction of the first monomer and the second monomer.

A mass ratio of the activator in the slurry is about in the range of 0.5% to 5%. According to some embodiments, the mass ratio of the activator in the slurry is one of 0.8%, 1.5%, 2.8%, 3.6%, and 4.5%.

The activator is water. The activator hydrolyses the first monomer and the second monomer, so that a crosslinking reaction occurs.

Step S3: applying a leveling treatment on the slurry adhered to the inner surface of the tube 20, so that the surface roughness of the coating 10 is smoothed, which can be about in the range of 2 nm to 100 nm. During the transporting of the adhesive, the surface roughness of the coating 10 should not be too great, which would hinder a flow of the adhesive.

An angle for leveling treatment applied on the slurry is about in the range of 45 degrees to 90 degrees.

A time period of leveling treatment applied on the slurry is about in the range of 0.1 h to 1 h. According to some embodiments, the time period of the leveling treatment is one of 0.2 h, 0.4 h, 0.6 h, 0.8 h, and 0.9 h.

Step S4: curing the slurry to form the injection needle 100 with the coating 10 on the inner surface of the tube 20.

A temperature for curing the slurry is about in the range of 70 degrees Celsius to 80 degrees Celsius. According to some embodiments, the temperature is one of 72 degrees Celsius, 74 degrees Celsius, 76 degrees Celsius, and 78 degrees Celsius.

A time period for curing the slurry is about in the range of 2 h to 6 h. According to some embodiments, the time period is one of 2.6 h, 3.3 h, 4.2 h, 4.9 h, and 5.4 h.

Hereinafter, the disclosure will be described through specific embodiments. In the following embodiments, the material of the tube 20 contains stainless steel, and the tubes are all needles.

Example 1

A hydroxylated injection needle was immersed in the slurry including the first monomer and the second monomer. The first monomer was methyltriethoxysilane. The mass ratio of methyltriethoxysilane in the slurry was 0.3%. The second monomer was tetramethyl orthosilicate. The mass ratio of tetramethyl orthosilicate in the slurry was 5%.

The structural formula of methyltriethoxysilane was

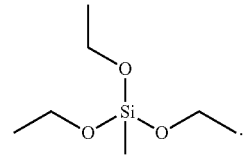

The structural formula of tetramethyl orthosilicate was

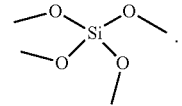

After the slurry was leveled, the slurry was cured to form a coating on the inner surface of the injection needle.

After a contact angle test, the contact angle of the coating was 100 degrees. The injection needle with the coating continuously transports adhesive, and the service life of the injection needle was 38 h.

Example 2

A difference from the Example 1 was that the first monomer was triethoxyisobutylsilane, the mass ratio of triethoxyisobutylsilane in the slurry was 0.6%; and the second monomer was tetraethyl orthosilicate, and the mass ratio of tetraethyl orthosilicate in the slurry was 5% in Example 2.

The structural formula of triethoxyisobutylsilane was

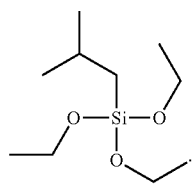

The structural formula of tetraethyl orthosilicate was

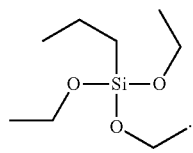

The contact angle of the coating was 88 degrees. The service life of the injection needle was 46 h.

Other features are as in Example 1, and are not repeated here.

Example 3

A difference from the Example 1 was that the first monomer was propyltriethoxysilane, the mass ratio of propyltriethoxysilane in the slurry was 0.4%; and the second monomer was tetraisopropyl orthosilicate, and the mass ratio of tetraisopropyl orthosilicate in the slurry was 8% in Example 3.

The structural formula of propyltriethoxysilane was

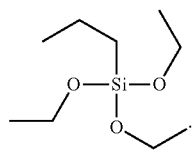

The structural formula of tetraisopropyl orthosilicate was

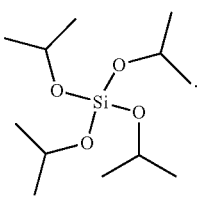 [SMILES: CC(C)O[Si](OC(C)C)(OC(C)C)OC(C)C]

The contact angle of the coating was 84 degrees. The service life of the injection needle was 36 h.

Other features are as in Example 1, and are not repeated here.

Example 4

A difference from the Example 1 was that the first monomer was 1,2-bis(triethoxysilyl)ethane, the mass ratio of 1,2-bis(triethoxysilyl)ethane in the slurry was 0.5%; and the second monomer was tetrabutylorthosilicate, and the mass ratio of tetrabutylorthosilicate in the slurry was 7% in Example 4.

The structural formula of 1,2-bis(triethoxysilyl)ethane was

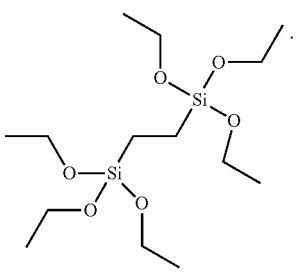 [SMILES: CCO[Si](CC[Si](OCC)(OCC)OCC)(OCC)OCC]

The structural formula of tetrabutylorthosilicate was

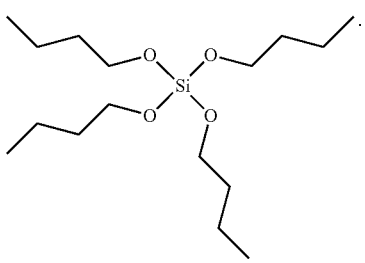 [SMILES: CCCCO[Si](OCCCC)(OCCCC)OCCCC]

The contact angle of the coating was 79 degrees. The service life of the injection needle was 34 h.

Other features are as in Example 1, and are not repeated here.

Example 5

A difference from the Example 1 was that the first monomer was trimethoxy(propyl)silane, and the mass ratio of trimethoxy(propyl)silane in the slurry was 0.5%; and the second monomer was tetraethyl orthosilicate, and the mass ratio of tetraethyl orthosilicate in the slurry was 5% in Example 5.

The structural formula of trimethoxy(propyl)silane was

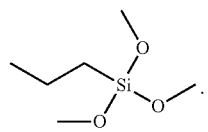

The structural formula of tetraethyl orthosilicate was

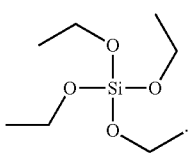

The contact angle of the coating was 87 degrees. The service life of the injection needle was 48 h.

Other features are as in Example 1, and are not repeated here.

Example 6

A difference from the Example 1 was that the first monomer was diethoxydimethylsilane, the mass ratio of diethoxydimethylsilane in the slurry was 0.7%; and the second monomer was tetraisopropyl orthosilicate, and the mass ratio of tetraisopropyl orthosilicate in the slurry was 7% in Example 6.

The structural formula of diethoxydimethylsilane was

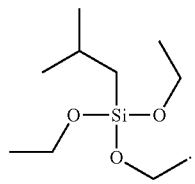

The structural formula of tetraisopropyl orthosilicate was

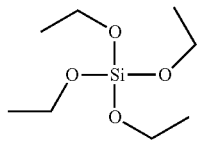

The contact angle of the coating was 75 degrees. The service life of the injection needle was 50 h.

Other features are as in Example 1, and are not repeated here.

Example 7

A difference from the Example 1 was that the first monomer was methoxy(trimethyl)silane, the mass ratio of methoxy(trimethyl)silane in the slurry was 0.2%; and the second monomer was tetraethyl orthosilicate, and the mass ratio of tetraethyl orthosilicate in the slurry was 4% in Example 7.

The structural formula of methoxy(trimethyl)silane was

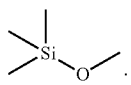

The structural formula of tetraethyl orthosilicate was

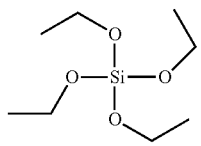

The contact angle of the coating was 92 degrees. The service life of the injection needle was 46 h.

Other features are as in Example 1, and are not repeated here.

Example 8

A difference from the Example 1 was that the first monomer was methyltriethoxysilane and methoxy(trimethyl)silane, the mass ratio of methyltriethoxysilane in the slurry was 1%, the mass ratio of methoxy(trimethyl)silane in the slurry was 0.5%; and the second monomer was tetraethyl orthosilicate and tetramethyl orthosilicate, the mass ratio of tetraethyl orthosilicate in the slurry was 3%, the mass ratio of tetramethyl orthosilicate in the slurry was 3% in Example 8.

The structural formula of methyltriethoxysilane was

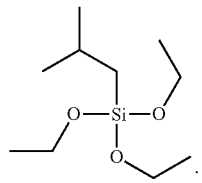

The structural formula of methoxy(trimethyl)silane was

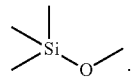

The structural formula of tetraethyl orthosilicate was

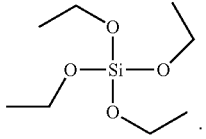

The structural formula of tetramethyl orthosilicate was

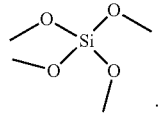

The contact angle of the coating was 106 degrees. The service life of the injection needle was 40 h.

Other features are as in Example 1, and are not repeated here.

Example 9

A difference from the Example 1 was that the first monomer was isobutyltriethoxysilane and diethoxydimethylsilane, the mass ratio of isobutyltriethoxysilane in the slurry was 0.5%, the mass ratio of diethoxydimethylsilane in the slurry was 1%; and the second monomer was tetraethyl orthosilicate and tetraisopropyl orthosilicate, the mass ratio of tetraethyl orthosilicate in the slurry was 4%, and the mass ratio of tetraisopropyl orthosilicate in the slurry was 1% in Example 9.

The structural formula of isobutyltriethoxysilane was

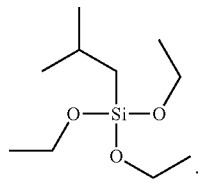

The structural formula of diethoxydimethylsilane was

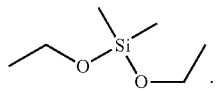

The structural formula of tetraethyl orthosilicate was

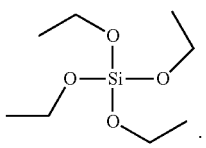

The structural formula of tetraisopropyl orthosilicate was

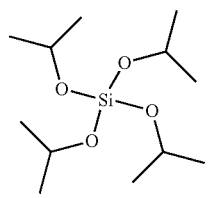

The contact angle of the coating was 98 degrees. The service life of the injection needle was 50 h.

Other features are as in Example 1, and are not repeated here.

Example 10

A difference from the Example 1 was that the first monomer was methyltriethoxysilane, methoxy(trimethyl)silane and trimethoxy(propyl)silane, the mass ratio of methyltriethoxysilane in the slurry was 0.5%, the mass ratio of methoxy(trimethyl)silane in the slurry was 0.5%, and the mass ratio of trimethoxy(propyl)silane in the slurry was 1%; and the second monomer was tetraethyl orthosilicate, and the mass ratio of tetraethyl orthosilicate in the slurry was 6% in Example 10.

The structural formula of methyltriethoxysilane was

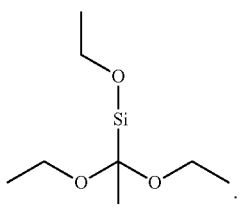

The structural formula of methoxy(trimethyl)silane was

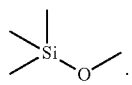

The structural formula of trimethoxy(propyl)silane was

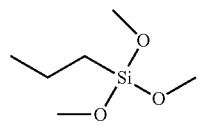

The structural formula of tetraethyl orthosilicate was

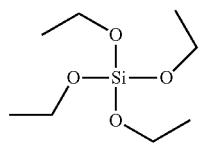

The contact angle of the coating was 90. The service life of the injection needle was 54 h.

Other features are as in Example 1, and are not repeated here.

Comparative Example 1

A difference from the Example 1 was that the monomer was (3-glycidyloxypropyl)trimethoxysilane, the mass ratio of (3-glycidyloxypropyl)trimethoxysilane in the slurry was 5% in Comparative Example 1.

The structural formula of (3-glycidyloxypropyl)trimethoxysilane was

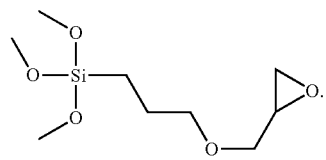

The contact angle of the coating was 60 degrees. The service life of the injection needle was 5 h.

Other features are as in Example 1, and are not repeated here.

Comparative Example 2

A difference from the Example 1 was that the monomer was (aminopropyl)triethoxysilane, the mass ratio of (aminopropyl)triethoxysilane in the slurry was 6% Comparative Example 2.

The structural formula of (aminopropyl)triethoxysilane was

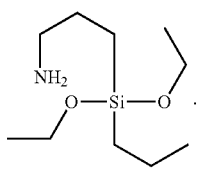

The contact angle of the coating was 70 degrees. The service life of the injection needle was 5 h.

Other features are as in Example 1, and are not repeated here.

Comparative Example 3

A difference from the Example 1 was that the monomer was vinyltrimethoxysilane, the mass ratio of vinyltrimethoxysilane in the slurry was 3% Comparative Example 3.

The structural formula of vinyltrimethoxysilane was

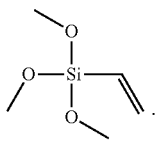

The contact angle of the coating was 65 degrees. The service life of the injection needle was 6 h.

Other features are as in Example 1, and are not repeated here.

Referring to Table 1 for the main different conditions and test results of Examples (short to Ex) 1 to 10 and Comparative Examples (short to Co-ex) 1 to 3.

Comparing the test results of Examples 1 to 10 and Comparative Examples 1 to 3 clearly shows that the contact angles of the injection needles with the coating made in Examples 1 to 10 are larger than those of Comparative Examples 1 to 3, which prevents the adhesive from sticking to the tube. Compared with Comparative Examples 1 to 3, the service life of the injection needles made in Examples 1 to 10 was greatly improved, and service life was 7 to 10 times that of Comparative Examples 1 to 3.

After the monomers provided in Comparative Examples 1 to 3 form the coating, they contain epoxy groups

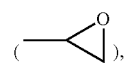

amine groups (—$NH_2$), vinyl groups (—CH=$CH_2$) and other active groups, which readily react with the oxygen-containing functional groups in the adhesive, and the adhesive blocks the tube after a period of use. After the monomers provided in Examples 1 to 10 form the coating, the surface of the coating was alkyl with good chemical stability, and alkyl does not react with the adhesive, thereby effectively increasing the service life of the injection needle.

In the coating provided in the disclosure, the outermost surface of the coating is composed of alkyl. The alkyl has excellent chemical stability, and do not react with the adhesive, thus effectively increase the service life of the injection needle. The method for manufacturing the coating in the disclosure, the raw materials are silane and silicate, and these raw materials are easily available, which is beneficial to reduce production costs. The method for manufacturing the coating has low requirements for equipment. The coating can be mass-produced. The method for manufacturing the coating also reduces the preparation cost, the reaction temperature is low, and the plastic will not be affected.

TABLE 1

| | first monomer | | second monomer | | contact angle | service life |
|---|---|---|---|---|---|---|
| | name | mass ratio | name | mass ratio | (degrees) | (h) |
| Ex 1 | methyltriethoxysilane | 0.3% | tetramethyl orthosilicate | 5% | 100 | 38 |
| Ex 2 | triethoxyisobutylsilane | 0.6% | tetraethyl orthosilicate | 5% | 88 | 46 |
| Ex 3 | propyltriethoxysilane | 0.4% | tetraisopropyl orthosilicate | 8% | 84 | 36 |
| Ex 4 | 1,2-bis(triethoxysilyl)ethane | 0.5% | tetrabutylorthosilicate | 7% | 79 | 34 |
| Ex 5 | trimethoxy(propyl)silane | 0.5% | tetraethyl orthosilicate | 5% | 87 | 48 |
| Ex 6 | diethoxydimethylsilane | 0.7% | tetraisopropyl orthosilicate | 7% | 75 | 50 |
| Ex 7 | methoxy(trimethyl)silane | 0.2% | tetraethyl orthosilicate | 4% | 92 | 46 |
| Ex 8 | methyltriethoxysilane, methoxy(trimethyl)silane | 1%, 0.5% | tetraethyl orthosilicate, tetramethyl orthosilicate | 3%, 3% | 106 | 40 |
| Ex 9 | isobutyltriethoxysilane, diethoxydimethylsilane | 0.5%, 1% | tetraethyl orthosilicate, tetraisopropyl orthosilicate | 4%, 1% | 98 | 50 |
| Ex 10 | methyltriethoxysilane, methoxy(trimethyl)silane, trimethoxy(propyl)silane | 0.5%, 0.5%, 1% | tetraethyl orthosilicate | 6% | 90 | 54 |
| Co-ex 1 | (3-glycidyloxypropyl)trimethoxysilane | 5% | without | without | 60 | 5 |
| Co-ex 2 | (aminopropyl)triethoxysilane | 6% | without | without | 70 | 5 |
| Co-ex 3 | vinyltrimethoxysilane | 3% | without | without | 65 | 6 |

What is claimed is:

1. A method for manufacturing a coating applied on an injection needle for transporting adhesive, the injection needle comprising a tube, the method comprising:
applying a hydroxylation treatment on the tube to form hydroxyl groups on an inner surface of the tube;
immersing the tube in a slurry; wherein the slurry comprises a first monomer and a second monomer, the first monomer is selected from a silane containing at least one alkoxy and at least one alkyl, and the second monomer is selected from a silicate ester;
applying a leveling treatment on the slurry adhered to the inner surface of the tube; and
curing the slurry to form the coating on the inner surface of the tube;
wherein, the alkyl in the silane and a alkyl in the silicate ester are independently selected from a group consisting of substituted alkyl and unsubstituted alkyl; the silane comprises at least one selected from a group consisting of monosilane and bisilane; the silicate ester comprises at least one selected from a group consisting of monosilate ester and bisilate ester;
an angle for the leveling treatment applied on the slurry is in a range of 45 degrees to 90 degrees; a time period of the leveling treatment applied on the slurry is in a range of 0.1 h to 1 h; a temperature for curing the slurry is in a range of 70 degrees Celsius to 80 degrees Celsius; and a time period for curing the slurry is in a range of 2 h to 6 h.

2. The method of claim 1, wherein an alkyl group in the silane and an alkyl group in the silicate are independently selected from alkyl with not more than four carbon atoms.

3. The method of claim 2, wherein at least one of the alkyl in the silane and the alkyl in the silicate is selected from fluoroalkyl.

4. The method of claim 1, wherein a material of the tube comprises stainless steel, applying the hydroxylation treatment on the tube comprises:
applying a plasma treatment in an air atmosphere to form hydroxyl groups on the tube; wherein a power of a plasma treatment machine in the plasma treatment is in a range of 100 W to 1000 W, and a time period of the plasma treatment is in a range of 0.5 min to 10 min.

5. The method of claim 1, wherein the slurry comprises at least one selected from a group consisting of film-forming agent, viscosity regulator, dispersant, leveling agent, catalyst, and activator.

6. The method of claim 5, wherein a mass ratio of the film-forming agent in the slurry is in a range of 1% to 15%.

7. The method of claim 5, wherein the film-forming agent is at least one selected from a group consisting of dimethylsilanol, polymethylsilanetriol, tetraethyl orthosilicate, methyltriethoxysilane, dimethyldi ethyl silane, ethyltrimethoxysilane, ethane-1,2-diylbis(methylsilane), 3-(aminopropyl)triethoxysilane, and 3-methacryloxypropyltrimethoxysilane.

8. The method of claim 7, wherein the film-forming agent is at least two selected from a group consisting of tetraethyl orthosilicate, methyltriethoxysilane, dimethyldiethylsilane, ethyltrimethoxysilane and ethane-1,2-diylbis(methylsilane).

9. The method of claim 5, wherein a mass ratio of the viscosity regulator in the slurry is in a range of 10% to 20%.

10. The method of claim 5, wherein the viscosity regulator is at least one selected from a group consisting of ethyl acetate, isopropyl acetate, ethylene glycol methyl ether acetate, di(propylene glycol) methyl ether acetate, propylene glycol methyl ether acetate, dipropylene glycol methyl ether acetate, propylene glycol ethyl ether acetate, and dipropylene glycol ethyl ether acetate.

11. The method of claim 10, wherein the viscosity regulator is at least two selected from a group consisting of ethyl acetate, isopropyl acetate, di(propylene glycol) methyl ether acetate, and dipropylene glycol methyl ether acetate.

12. The method of claim 5, wherein a mass ratio of the dispersant in the slurry is in a range of 1% to 9%.

13. The method of claim 5, wherein the dispersant is selected at least one from a group consisting of methanol, ethanol, isopropanol, n-butanol, and isobutanol.

14. The method of claim 13, wherein the dispersant is at least two selected from a group consisting of methanol, ethanol and isopropanol.

15. The method of claim 5, wherein a mass ratio of the leveling agent in the slurry is in a range of 55% to 90%.

16. The method of claim 5, wherein the leveling agent is at least one selected from a group consisting of 2-methoxyethanol, diethylene glycol monomethyl ether, 1-methoxy-2-propanol, dipropylene glycol monomethyl ether, 2-ethoxyethanol, diethylene glycol monoethyl ether, 1-ethoxy-2-propanol, and dipropylene glycol ethyl ether.

17. The method of claim 5, wherein a mass ratio of the catalyst in the slurry is in a range of 0.02% to 2%.

18. The method of claim 5, wherein the catalyst is at least one selected from a group consisting of formic acid, acetic acid, hydrochloric acid, and hydrofluoric acid.

19. The method of claim 5, wherein a mass ratio of the activator in the slurry is in a range of 0.5% to 5%.

* * * * *